United States Patent [19]
Brown

[11] Patent Number: 6,052,790
[45] Date of Patent: Apr. 18, 2000

[54] COMPUTER SYSTEM WITH IMPROVED DC TO DC POWER CONVERSION EMPLOYING CAPACITIVE ENERGY STORAGE RESERVOIRS

[75] Inventor: Alan E. Brown, Georgetown, Tex.

[73] Assignee: Dell USA, L.P., Round Rock, Tex.

[21] Appl. No.: 09/013,969

[22] Filed: Jan. 27, 1998

[51] Int. Cl.[7] ...................................................... G06F 1/26
[52] U.S. Cl. ............................ 713/300; 363/26; 323/267
[58] Field of Search ..................................... 713/300, 501; 323/222, 224, 266, 267, 288, 285, 351; 363/21, 26, 41, 89, 97; 307/75

[56] References Cited

U.S. PATENT DOCUMENTS

| | | | |
|---|---|---|---|
| 4,030,015 | 6/1977 | Herko et al. ................................. | 321/2 |
| 4,245,286 | 1/1981 | Paulkovich et al. ...................... | 363/21 |
| 4,355,277 | 10/1982 | Davis et al. ............................. | 323/351 |
| 4,801,859 | 1/1989 | Dishner ................................... | 323/224 |
| 4,940,929 | 7/1990 | Williams ................................. | 323/222 |
| 5,140,513 | 8/1992 | Yokoyama ................................ | 363/26 |
| 5,519,307 | 5/1996 | Moon ...................................... | 323/222 |
| 5,534,768 | 7/1996 | Chavannes et al. ...................... | 323/267 |

OTHER PUBLICATIONS

The AARL Handbook—1994, "Switched Mode Power Supplies" pp. 6–27 through 6–36.

"Switching Power Supply Design," by Abraham I. Pressman; pp. 3–35.

Primary Examiner—Gopal C. Ray
Attorney, Agent, or Firm—Mark P. Kahler

[57] ABSTRACT

A personal computer includes a DC to DC converter which employs a dual function capacitive energy storage device at the output rail of the converter. The energy storage device provides both a transition control function and a bulk or output function. In this manner, the size and expense of a separate bulk capacitor is advantageously avoided. The converter includes a switching transistor coupled to a bulk inductor. The switching transistor exhibits a high frequency switching rate which is sufficiently high to permit the inductor to directly replenish the capacitive energy storage device thus enabling the converter to withstand both major and minor load fluctuations without loss of voltage regulation at the output rail.

21 Claims, 5 Drawing Sheets

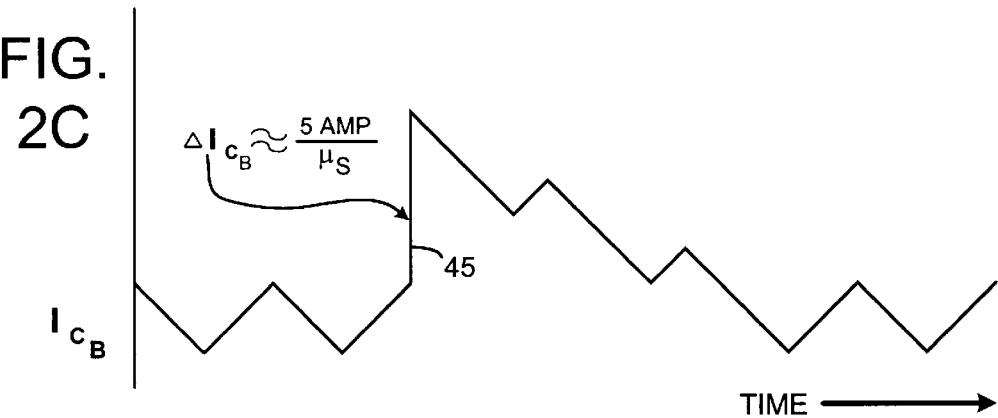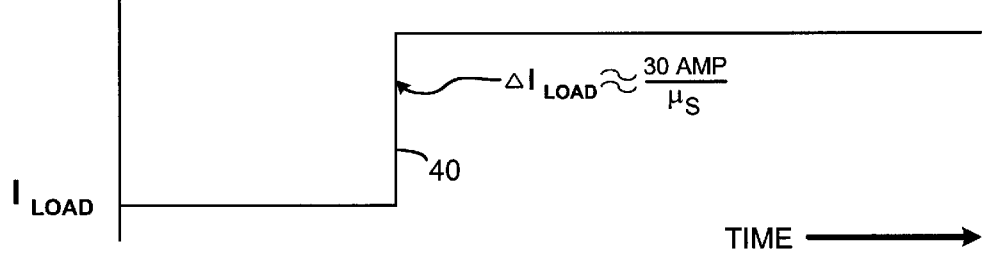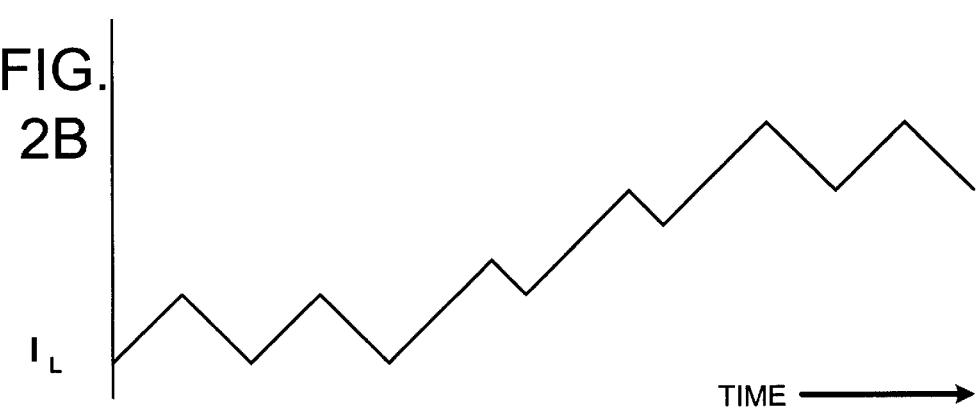

COMPUTER SYSTEM WITH IMPROVED DC TO DC POWER CONVERSION EMPLOYING CAPACITIVE ENERGY STORAGE RESERVOIRS

BACKGROUND OF THE INVENTION

1. Field of the Invention

The disclosures herein relate generally to personal computer systems and more particularly to personal computer systems employing DC to DC power conversion.

2. Description of the Related Art

Personal computer systems in general and Intel/Microsoft compatible personal computer systems in particular have attained widespread acceptance. The term compatible is used to denote those computer systems employing microprocessor and chip set hardware supplied by Intel Corporation and operating system software supplied by Microsoft Corporation. These personal computer systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, one or more floppy diskette drives, a mass storage device, an optional CD-ROM or DVD drive and an optional printer. One of the distinguishing characteristics of these systems is the use of a system board or motherboard to electrically connect these components together. These personal computer systems are information handling systems which are designed primarily to provide independent computing power to a single user, (or a relatively small group of users in the case of personal computers which serve as server systems.)

Personal computer systems typically include a power supply which converts AC mains power (120 volts in the United States, and 220 volts in many other countries) down to a smaller DC voltage useful for supplying the various components of the computer system. Different components of the computer system often have different DC voltage requirements. For example, the power rail which supplies an appropriate DC voltage to the microprocessor of the computer system may have one voltage requirement. The L2 cache associated with the microprocessor may have another voltage requirement while the system bus and peripherals may have still other voltage requirements. Personal computer systems typically include several DC to DC converters to down convert one DC voltage from the power supply to respective voltages used by the particular components of the computer system.

A conventional switched mode DC to DC buck converter useful for this purpose is depicted in FIG. 1 as converter 10. Converter 10 includes a switching transistor Q1 to which an input DC voltage $V_{IN}$ is provided. A free-wheeling diode D1 is coupled between the emitter of switching transistor Q1 and ground. A large inductor L, with a inductance of 5 to 10 $\mu$H for example, is coupled between load 15 and the juncture of the transistor Q1 emitter and diode. The output rail of the converter is designated as output rail 20 and the output voltage $V_{OUT}$ is generated at this rail. A pulse width modulator (PWM) IC 25 is coupled between output rail 20 and the input or base of switching transistor Q1. PWM IC 25 senses the output voltage $V_{OUT}$ as the load 15 varies and appropriately adjusts the pulse width of the control signal applied to switching transistor Q1 to dynamically regulate the output voltage $V_{OUT}$ to the desired value. The operation of a buck converter similar to buck converter 10 is described in more detail in the publication "ARRL Handbook For Radio Amateurs", pages 6–27 through 6–28, published by the American Radio Relay League, the disclosure of which is incorporated herein by reference. The operation of another buck converter similar to buck converter 10 is described in "Switching Power Supply Design" by Pressman, published by McGraw Hill, pages 3–35, the disclosure of which is incorporated herein by reference. The switching frequency of switching transistor Q1 in conventional converter 10 is relatively low, for example 100 KHz in the present example.

During normal operation, the load presented to a DC to DC converter can vary from minor to major current fluctuations. For example, the DC to DC converter which supplies power to the microprocessor power rail will experience high frequency load fluctuations at the microprocessor switching rate which is in the MHz range. The average load current can be substantially constant with minor fluctuations or can change dramatically due to a change in microprocessor state condition such as transitioning from a sleep state to a fully active state (i.e. a major fluctuation).

Thus, the DC to DC converter in a computer system must be able to deal with both of the major and minor fluctuations in load current. The system bus and other buses of the computer system experience significant changes in operating current as well. Moreover, other I/O devices in the system, such as hard drives, floppy drives, CD ROMs, DVDs also present varying current requirements. It is important that a DC to DC converter be able to provide relatively constant DC output voltage as the load dynamically changes.

Conventional DC to DC buck converter 10 responds to load changes in the following manner. DC to DC buck converter 10 includes a plurality of transition control capacitors 30 which are collectively designated as $C_A$. The $C_A$ capacitors are coupled between output rail 20 and ground as shown in FIG. 1. Typically, the $C_A$ capacitors are physically located adjacent load 15. The $C_A$ capacitors function as high frequency bypass capacitors which control the noise at rail 20 with respect to ground, such noise being due to the switching transitions of the microprocessor or other load 15 presented to the converter. The $C_A$ capacitors are typically low ESR (equivalent series resistance)/low ESL (equivalent series inductance) devices. For this reason, when charged, they are capable of maintaining the voltage at load 15 by becoming a source of current into load 15 when high frequency load transitions occur. This can occur because of the very low parasitic series resistive and inductive properties of this type of capacitor as compared to the $C_B$ capacitors discussed subsequently. The $C_A$ capacitors typically are relatively small capacitors such as 1 to 22 uF tantalum or ceramic capacitors.

To address major load fluctuations, such as when the load changes dramatically from 5A to 35A, converter 10 employs a plurality of capacitors 35, designated collectively as $C_B$, which are coupled between output rail 20 and ground as shown. The $C_B$ capacitors typically are relatively large capacitors such as 820 uF to 3900 uF high performance aluminum electrolytic which often take the form of physically large silos. These $C_B$ capacitors function together as a bulk capacitor or output capacitor for the converter. When the $C_A$ transition control capacitors experience a transition at the microprocessor rate, they dump current into the load to control the transition. At the same time, the bulk capacitors $C_B$ start to replenish the energy of the $C_A$ transition control capacitors. This is one of the functions of the bulk capacitors $C_B$. It is noted that for minor load variations as well, capacitor $C_B$ still replenishes capacitor $C_A$ except to a lesser magnitude according to the lesser needs of $C_A$ during a minor load fluctuation.

To summarize, the $C_A$ capacitors provide a substantial energy source during each microprocessor cycle (or other load cycle) independent of average microprocessor load. In between each microprocessor clock cycle there is energy replacement or replenishment from capacitors $C_B$ to capacitors $C_A$ at a somewhat lower transfer rate than the microprocessor consumption rate at microprocessor clock transitions. That replenishment rate is defined mostly by parasitic inductances within capacitors $C_B$ or physical implementation limitations such as printed circuit board (PCB) impedances or connector impedances between $C_B$ and $C_A$. During a very large step load change the amount of energy replenishment from $C_B$ to $C_A$ will be proportional to the magnitude of the step load change.

FIG. 2A is a time line diagram of the load current, $I_{LOAD}$, vs. time. It is observed that at transition 40 the load current rapidly increases as the microprocessor activities change. FIG. 2B is a time line diagram of the inductor current, $I_L$, vs. time. The average rate of change for $I_L$ is determined by the PWM IC 25. The average rate of change of $I_L$ is considerably slower than the rate of change of $I_{LOAD}$. FIG. 2C is a time line diagram of the current $I_{CB}$ in series with capacitor $C_B$. It is noted that transition 45 is a slower transition than observed at transition 40 in FIG. 2B due to the parasitics observed and discussed earlier. During this discrepancy period, it is capacitor $C_A$ which is supplying energy to maintain the load current, $I_{LOAD}$, thus maintaining the load voltage within a predetermined regulation.

SUMMARY OF THE INVENTION

It has been discovered that the $C_B$ capacitor can be eliminated and that a dual function capacitor $C_D$ can be used in place of transition control capacitor $C_A$ and bulk capacitor $C_B$ by switching the switching transistor at a substantially increased high frequency rate as compared to the prior art technique discussed above. In this manner, the dual function capacitor $C_D$ is replenished with sufficient energy to enable the output of the converter to withstand both major and minor current load fluctuations while maintaining voltage regulation.

In accordance with one embodiment of the present invention, a computer system is provided which includes a processor and a system memory coupled to the processor. The computer system also includes a bus coupled to the processor and an I/O device coupled to the bus. A power plane supplies power to a portion of the computer system. The computer system includes a switching buck converter having a voltage input and a voltage output, the voltage output being coupled to the power plane for providing a regulated voltage thereto. The switching buck converter further includes a switching transistor coupled to the voltage input and the voltage output. A capacitive energy storage device is coupled to the voltage output. A pulse width modulated control loop is coupled from the voltage output to the switching transistor to switch the switching transistor of the converter at a sufficiently high switching frequency that the capacitive energy storage device provides both transition control and bulk functions when the converter experiences a current load fluctuation at the voltage output.

Many advantages are achieved by the described computer system employing such a DC to DC converter arrangement. For example, the parts count can be significantly reduced and increased volumetric efficiency is achieved. The converter rapidly responds to both major and minor fluctuations in the current load presented to the converter.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIG. 2A is a time line graph of the load current vs. time in the conventional DC to DC converter of FIG. 1.

FIG. 2B is a time line graph of the current through the inductor vs. time in the conventional DC to DC converter of FIG. 1.

FIG. 2C is a time line graph of the current through the bulk capacitor $C_B$ vs. time in the conventional DC to DC converter of FIG. 1.

DETAILED DESCRIPTION OF THE PREFERRED EMBODIMENTS

Figure 3:
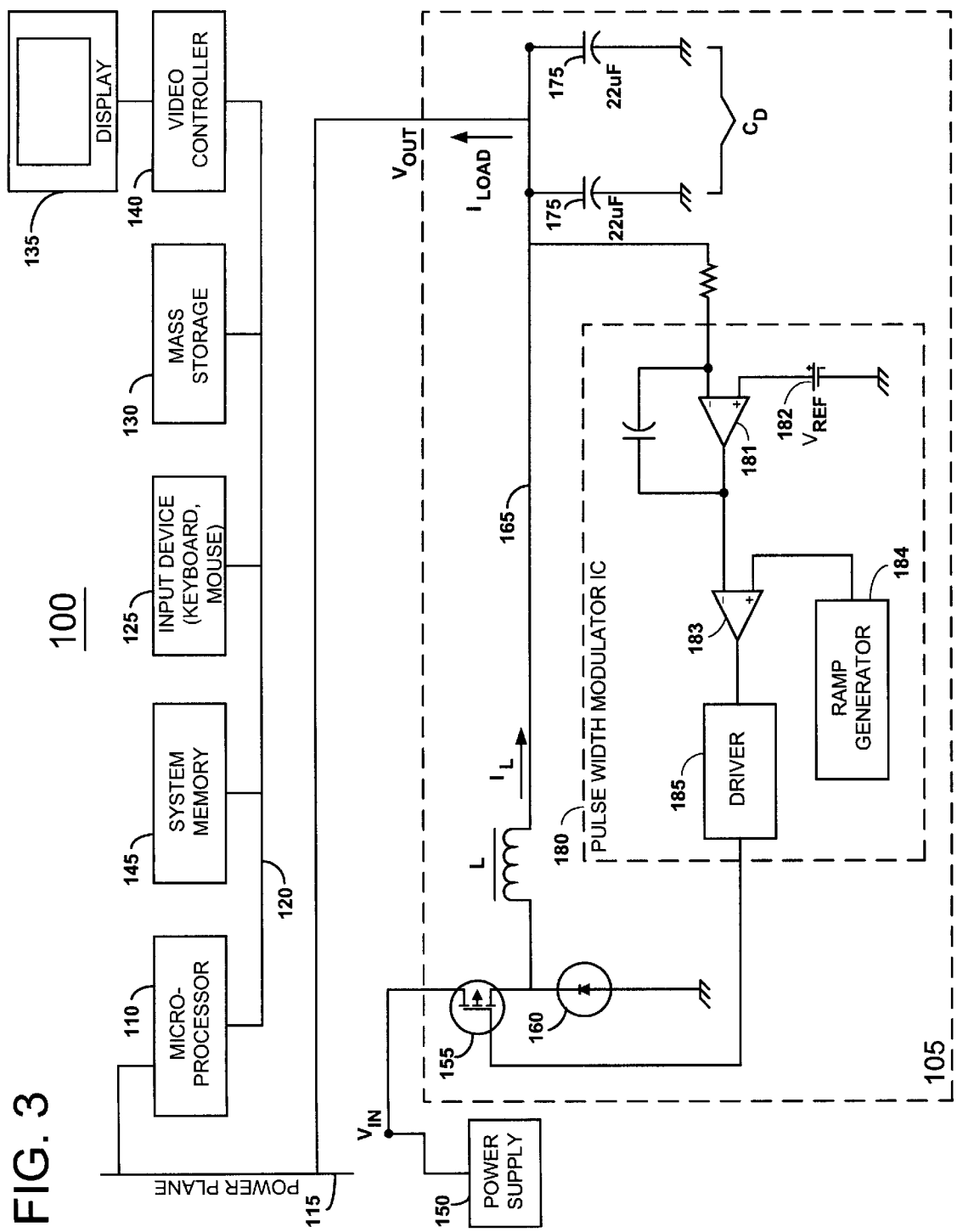
FIG. 3 is a schematic block diagram of the disclosed computer system including an improved DC to DC converter.

Referring to FIG. 3, a schematic block diagram shows a computer system 100 including an enhanced DC to DC converter 105. Computer system 100 includes a microprocessor 110 coupled to a power output rail or power plane 115. Microprocessor 110 presents at least two different types of load fluctuations to power rail 115 and converter 105 which is coupled thereto. More particularly, microprocessor 110 presents both minor and major load fluctuations to the converter at the microprocessor switching rate. For example, an example of a minor load current change is an approximately 25% load current variation which is observed in normal continuous microprocessor operation. In contrast, a major load fluctuation occurs during non-continuous operation when the microprocessor changes from a very low power sleep state to a fully operational state. A 95% load step or change in current load would be one example of a major load fluctuation.

Microprocessor 110 is typically a Pentium or Pentium II microprocessor manufactured by Intel Corporation. Microprocessor 110 is coupled to a bus 120. Bus 120 servers as a connection between microprocessor 110 and other components of computer system 100. An input device 125 is coupled to microprocessor 110 to provide input to microprocessor 110. Examples of input devices include keyboards, touchscreens, and pointing devices such as mouses, trackballs and trackpads. Programs and data are stored in a mass storage device 130 which is coupled to microprocessor 110 via bus 120. Mass storage device 130 includes such devices as hard disks, optical disks, magneto-optical disks, floppy drives, CD-ROMs, DVDs and the like. Computer system 100 further includes a display 135 which is coupled to microprocessor 110 by a video graphics controller 140. A system memory 145 is coupled to microprocessor 110 to provide the microprocessor with fast storage to facilitate execution of computer programs. It should be understood that other busses and intermediate circuits can be deployed between the components described above and microprocessor 110 to facilitate interconnection between the components and the microprocessor. Bridge chips (not shown) are used to couple the microprocessor to various conventional buses such as the PCI (Peripheral Component Interconnect) bus and the ISA (Industry Standard Architecture) bus to facilitate connection to interface cards and peripherals.

Computer system 100 includes a main power supply 150 which converts the 120 volts or 220 volts AC mains power to a lower DC voltage, for example +5 VDC. The output of power supply 150 is coupled to the $V_{IN}$ input of DC to DC converter 105. The $V_{IN}$ input of converter 105 is coupled to the drain of an enhancement mode switching MOSFET 155. For example, the Motorola 20N03 transistor can be employed as FET 155. The source of switching FET 155 is coupled via free-wheeling diode 160 to ground as shown. An inductor L, exhibiting a value of approximately 500 nH is coupled between the $V_{OUT}$ output of converter 105 and the source of FET 155. A voltage rail 165 is thus formed between inductor L and the $V_{OUT}$ output of converter 105.

A dual function energy storage device $C_D$ is coupled from voltage rail 165 to ground as shown in FIG. 3. In practice, $C_D$ includes a plurality of capacitors 175. For example, in one embodiment, $C_D$ includes 10 small surface mount ceramic capacitors 175 each with a value of 22 uF. The load transitions of $I_{LOAD}$ and the current waveform of inductor L which provides the replenishment energy for $C_D$ are within desirable ESR and ESL characteristics of this capacitor type. Sourcing or current replenishment for $C_D$ is provided by the waveform driven by inductor L into capacitor $C_D$. The switching rate of FET 155 is selected to be a sufficiently high frequency to permit $C_D$ to be replenished with energy when fluctuations in load current $I_{LOAD}$ are experienced. For example, in the particular embodiment shown in FIG. 3, a switching rate of 2 MHz is employed for FET 155 and a control loop frequency of 1 MHz is employed. The control loop refers to the loop formed by pulse width modulator IC 180 which senses the voltage output, VOUT, and which in response controls the width of the pulse width modulated control signal supplied to the gate of switching FET 155. By employing such a high frequency switching rate, converter 105 advantageously enables capacitors $C_D$ to provide both the function of a bulk or output capacitor and the function of a transition control capacitor. A more volumetrically efficient power converter is thus provided since the need for a separate bulk capacitor $C_B$ is eliminated in DC to DC converter 105.

Two features combine to permit converter 105 to achieve the rate of replenishment needed by energy storage device $C_D$ to maintain a virtually constant voltage from rail 165 to ground. These features are first, the dramatically increased FET switching rate which allows for the control loop to run much faster than in conventional DC to DC converters, and second, with the higher switching rate the inductance of L is substantially reduced in the disclosed converter 105 as compared to conventional converters. For example, the switching frequency (2 MHz) of the disclosed embodiment is 20 times the switching frequency (100 KHz) of the conventional converter discussed earlier. The inductance of L in converter 105 is approximately 500 nH which is substantially smaller than the 5 to 10 $\mu$H inductor employed in the conventional converter. It should be understood that such values are not limiting but rather are merely illustrative. These values will vary according to the particular application. What is important is that the switching frequency be sufficiently high to permit replenishment of capacitors $C_D$ during $I_{LOAD}$ fluctuations without the use of a separate bulk capacitor. Depending on the particular circuit configuration, high frequency switching frequencies within the range of approximately 1 MHz to approximately 3 MHz or higher may be employed.

Again, these high frequency switching frequencies in converter 105 are observed to be substantially higher than employed in conventional converters. Moreover, significantly smaller inductors L within the range of approximately 200 nH to approximately 600 nH are employed, although depending on the particular application the inductor value may vary from this range. Advantageously, the inductor size is substantially reduced compared with conventional converters such that less printed circuit board surface area is required.

Converter 105 includes a control loop formed by a conventional pulse width modulator (PWM) IC 180 which is coupled to the $V_{OUT}$ voltage output and the gate input of switching FET 155 as shown. PWM circuit 180 includes an OP AMP error amplifier 181 coupled to a voltage source 182 ($V_{REF}$) as shown. The output of error amplifier 181 is coupled to the negative input of a comparator 183. The remaining positive input of comparator 183 is coupled to a ramp generator 184 in the conventional fashion. The output of comparator 183 is coupled via a driver amplifier 185 to the gate input of switching transistor 155.

Figure 4A:
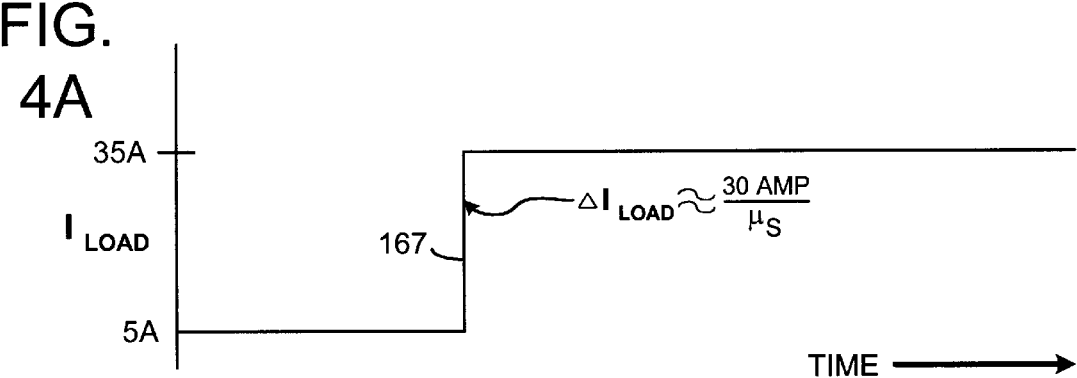
FIG. 4A is a time line graph of the load current vs. time in the disclosed DC to DC converter of FIG. 3.
Figure 4B:
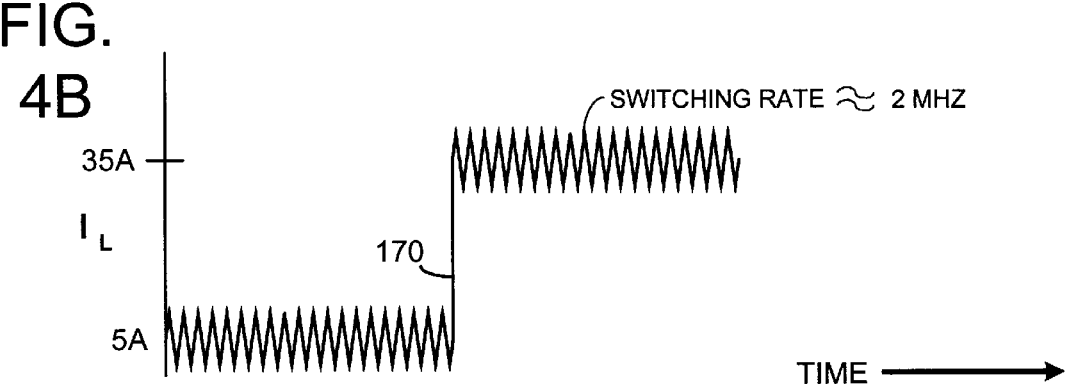
FIG. 4B is a time line graph of the current through the inductor vs. time in the disclosed DC to DC converter of FIG. 3.

FIG. 4A is a time line graph of the load current $I_{LOAD}$ vs. time of converter 105. A major and abrupt load fluctuation at the microprocessor switching rate is observed at transition 167. This representative fluctuation is a 30A/uS change in load current from 5A to 35A, for example. FIG. 4B is a time line graph of the current $I_L$ through the inductor L vs. time in the disclosed DC to DC converter of FIG. 3. The ripple observed in the $I_L$ inductor current occurs at the switching rate of FET 155, namely 2 MHz in this particular embodiment.

Figure 1:
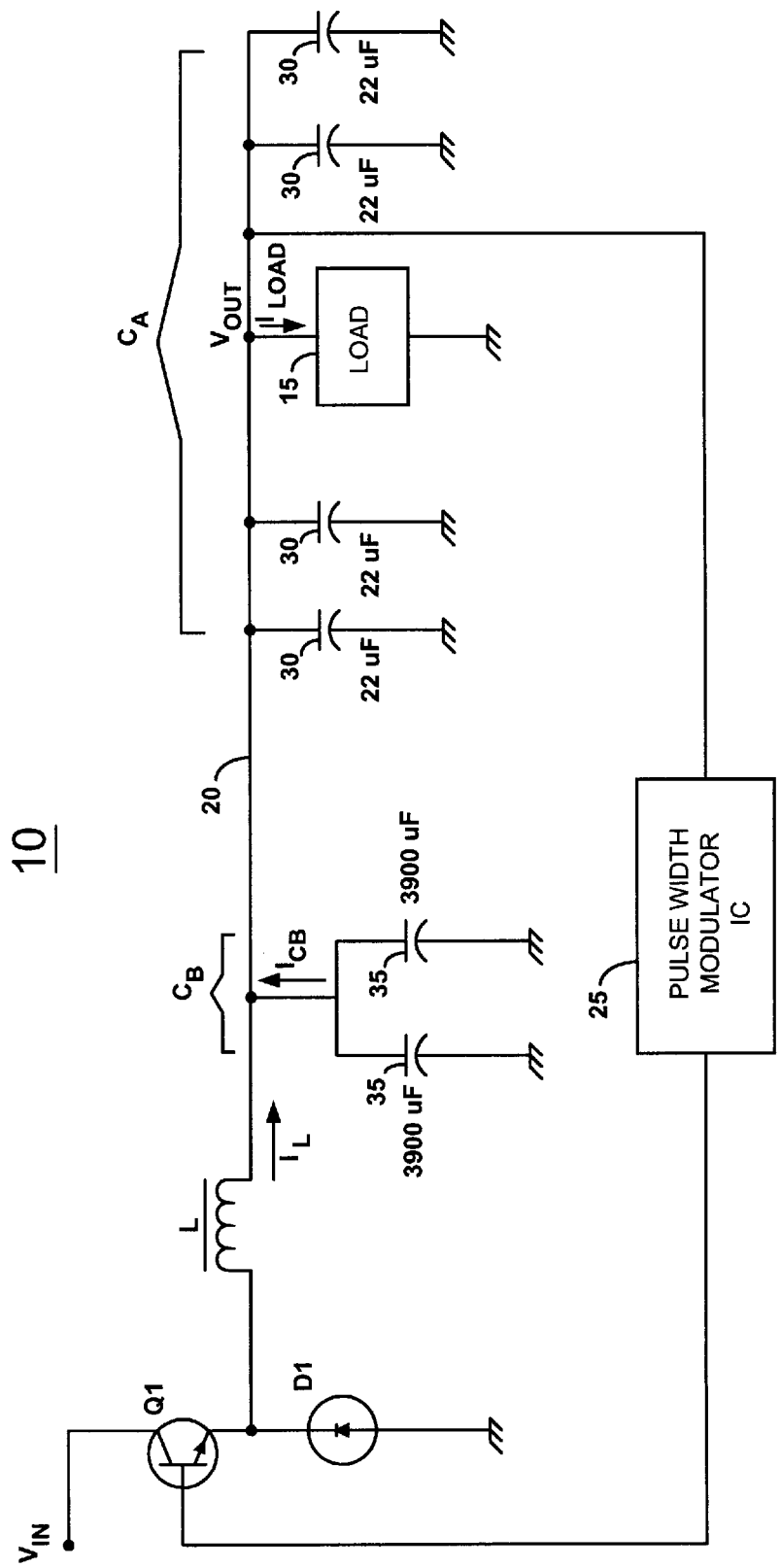
FIG. 1, labeled PRIOR ART, is a schematic block diagram illustrating a conventional DC to DC converter.

To appreciate the significant distinctions between the conventional DC to DC converter of FIG. 1 and converter 105 it is helpful to understand that the prior converter employs a three step regulation process whereas the disclosed converter 105 employs a two step regulation process. More particularly, the prior converter is first subjected to a load current fluctuation, then second the transition control capacitor $C_A$ dumps current to the load and third the bulk capacitor $C_B$ replenishes the energy in capacitor $C_A$. The PWM IC control loop provides the conventional function of adjusting the duration of the pulse width supplied to the input of the switching transistor to provide dynamic regulation. In contrast, the disclosed converter 105 operates with a two step process. First a load transition occurs and second, the rate of change of the replenishment current into $C_D$ occurs at a sufficiently high rate to allow for only a very minor decay in the voltage at $C_D$ with respect to ground considering the amount of energy storage capacity available within $C_D$ and the minimal amount of parasitic losses within $C_D$. PWM IC 180 adjusts the pulse width of the switching signal supplied to FET 155 to achieve dynamic regulation. The disclosed converter advantageously avoids the step wherein a separate bulk capacitor $C_B$ replenishes a transition control capacitor $C_A$. In summary, it is noted that the prior converter employs an indirect replenishment process wherein inductor L supplies $C_B$ which in turn replenishes $C_A$. In contrast, in the disclosed converter 105, $C_D$ is directly replenished by the replenishment current from inductor L.

In the illustrative converter 105, the switching frequency is 2 MHz and the feedback loop crossover frequency through PWM IC 180 is approximately 1 MHz. Therefore, as compared with the prior converter of FIG. 1, there is a smaller delay at transition 170 in FIG. 4B for the disclosed converter 105 due to the time period at 1 MHz plus the ability of the inductor L to slew at a faster rate. Thus, the average step rate of the disclosed converter at 170 as compared to the prior converter is increased dramatically. All this is achieved without employing separate bulk capacitors $C_B$ and transition control capacitors $C_A$.

In the above described single phase converter embodiment shown in FIG. 3, switching FET 155 is switched by PWM IC 180 at a sufficiently high rate (e.g. 2 MHz) to permit the earlier described replenishment of capacitor $C_D$ and dynamic regulation of the load voltage to occur well within industry requirements for supplying DC voltages to the L2 caches associated with microprocessors. To supply DC voltage to the microprocessor power plane, it is more desirable to use the multi-phase converter 200 of FIG. 5 in place of converter 105 of FIG. 3.

Figure 5:
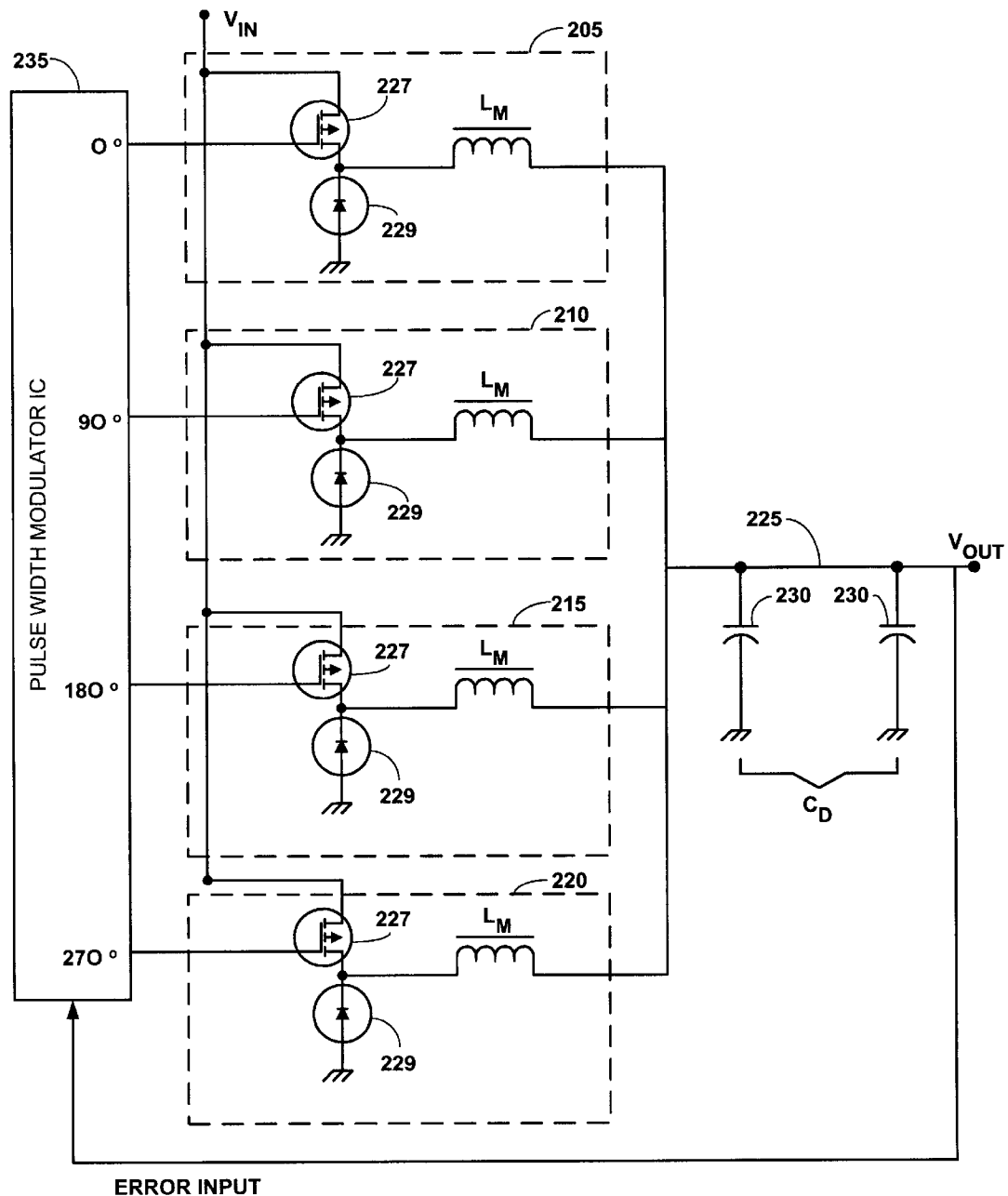
FIG. 5 is a schematic block diagram of the disclosed computer system including a four phase (or quad phase) DC to DC converter.

More particularly, FIG. 5 shows a 4 phase or quad phase embodiment of the disclosed DC to DC power converter as converter 200. Converter 200 includes four substantially identical buck converters 205, 210, 215 and 220. Buck converters 205, 210, 215 and 220 each include a switching transistor 227, a free-wheeling diode 229 and an inductor $L_M$ arranged in substantially the same fashion as switching transistor 155, diode 160 and inductor L of single phase converter 105 depicted in FIG. 3. The four inductors $L_M$ are coupled to a dual function energy storage device $C_D$ which is coupled between the output voltage rail 225 and ground as shown in FIG. 5. In practice, $C_D$ includes a plurality of capacitors 230. For example, in one embodiment, $C_D$ includes 14 small surface mount ceramic capacitors 230 each with a value of 22 uF. The $V_{OUT}$ output is coupled to a conventional four phase pulse width modulator (PWM) IC 235 which in response to an error input generates four pulse width modulated control signals which are supplied to the respective inputs of buck converters 205, 210, 215 and 220. The control signals are 90 degrees out of phase with respect to each other and are generated at 0 degrees, 90 degrees, 180 degrees and 270 degrees, respectively.

This 4 phase or quad phase converter provides even higher performance which satisfies even higher slew rates and provides output current levels for microprocessor logic and other applications. In this particular 4 phase embodiment, a rate of replenishment into capacitor $C_D$ of 8 MHz was found to be sufficient. To achieve this 8 MHz replenishment rate, the switching frequency of each phase is 2 MHz. An even higher rate of replenishment into capacitors $C_D$ is achieved when the switching frequency of each phase (each buck converter) is 3 MHz. In that instance, a replenishment rate of 12 MHz of ripple current is sourced into capacitors $C_D$ from inductors L. A quad phase converter operating in this manner responds very quickly to both major and minor load fluctuations. Again, the disclosed quad phase converter dramatically increases the replenishment rate into $C_D$ so as to no longer require a separate bulk capacitor, $C_B$. Rather, capacitor $C_D$ advantageously provides both a bulk capacitor function and a transition control function.

While the invention has been described with reference to various embodiments, it will be understood that these embodiments are illustrative and that the scope of the invention is not limited to them. For example, while single phase and quad phase converter embodiments are shown, a dual phase, six phase, eight phase and other phase converters are also contemplated. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A computer system comprising:

a processor;

a system memory coupled to the processor;

a bus coupled to the processor;

an I/O device coupled to the bus;

a power plane for supplying power to a portion of the computer system;

a switching buck converter including a voltage input and a voltage output, the voltage output being coupled to the power plane for providing a regulated voltage thereto, the switching buck converter further including:
   a switching transistor coupled to the voltage input and the voltage output;
   a capacitive energy storage device coupled to the voltage output; and
   a pulse width modulated control loop coupled from the voltage output to the switching transistor to switch the switching transistor of the converter at a sufficiently high switching frequency that the capacitive energy storage device provides both transition control and bulk functions when the converter experiences a current load fluctuation at the voltage output.

2. The computer system of claim 1 wherein the switching buck converter further includes an inductor coupled between the switching transistor and the voltage output.

3. The computer system of claim 2 wherein the switching frequency is a high frequency within the range of approximately 1 MHz to approximately 3 MHz.

4. The computer system of claim 1 wherein the switching buck converter comprises a single phase converter.

5. The computer system of claim 1 wherein the switching buck converter comprises a multi-phase converter.

6. The computer system of claim 1 wherein the switching buck converter comprises a quad phase converter.

7. The computer system of claim 1 wherein the capacitive energy storage device comprises a plurality of capacitors.

8. A computer system comprising:

a processor;

a system memory coupled to the processor;

a bus coupled to the processor;

an I/O device coupled to the bus;

a power plane for supplying power to a portion of the computer system;

a quad phase switching buck converter including a voltage input and a voltage output, the voltage output being coupled to the power plane for providing a regulated voltage thereto, the switching buck converter further including:
   first, second, third and fourth switching transistors coupled to the voltage input and the voltage output;
   a capacitive energy storage device coupled to the voltage output; and a pulse width modulated control loop coupled from the voltage output to the first, second, third and fourth switching transistors to provide respectively thereto first, second, third, and fourth switching control signals which are respectively phase at 0 degrees, 90 degrees, 180 degrees and 270 degrees with respect to each other, to switch the switching transistors of the converter at a sufficiently high switching frequency that the capacitive energy storage device provides both transition control and bulk functions when the converter experiences a current load fluctuation at the voltage output.

9. The computer system of claim 8 wherein the quad phase switching buck converter further includes respective first, second, third and fourth inductors coupled between the first, second, third and fourth switching transistors and the voltage output.

10. The computer system of claim 8 wherein the capacitive energy storage device comprises a plurality of capacitors.

11. The computer system of claim 8 wherein the switching frequency is a high frequency within the range of approximately 1 MHz to approximately 3 MHz.

12. The computer system of claim 11 wherein energy is replenished into the capacitive energy storage device at a rate within the range of approximately 4 to approximately 12 MHz.

13. A switching buck converter comprising:

a voltage input and a voltage output, a switching transistor coupled to the voltage input and the voltage output;

a capacitive energy storage device coupled to the voltage output; and a pulse width modulated control loop coupled from the voltage output to the switching transistor to switch the switching transistor of the converter at a sufficiently high switching frequency that the capacitive energy storage device provides both transition control and bulk functions when the converter experiences a current load fluctuation at the voltage output.

14. The switching buck converter of claim 13 further comprising an inductor coupled between the switching transistor and the voltage output.

15. The switching buck converter of claim 13 wherein the switching buck converter comprises a single phase converter.

16. The switching buck converter of claim 13 wherein the switching buck converter comprises a multi-phase converter.

17. The switching buck converter of claim 13 wherein the switching buck converter comprises a quad phase converter.

18. The switching buck converter of claim 13 wherein the capacitive energy storage device comprises a plurality of capacitors.

19. The switching buck converter of claim 13 wherein the switching frequency is a high frequency within the range of approximately 1 MHz to approximately 3 MHz.

20. A method of supplying power to a personal computer including a processor, a memory coupled to the processor, a host bus coupled to the processor, and an I/O device coupled to the host bus, the method comprising:

supplying power to the computer by a switching buck converter including a switching transistor coupled to a voltage output;

providing a capacitive energy storage device at the voltage output of the buck converter; and switching the switching transistor of the converter at a sufficiently high frequency that the capacitive energy storage device provides both transition control and bulk functions when the converter experiences a current load fluctuation at the voltage output.

21. A method of supplying power to a personal computer including a processor, a memory coupled to the processor, a host bus coupled to the processor, and an I/O device coupled to the host bus, the method comprising:

supplying power to the computer by a switching buck converter including a switching transistor coupled via an inductor to a voltage output;

providing a capacitive energy storage device at the voltage output of the buck converter; and switching the switching transistor of the converter at a sufficiently high frequency so that the inductor directly replenishes the capacitive energy storage device with sufficient energy to enable the converter to withstand both minor and major current fluctuations at the voltage output while maintaining voltage regulation.

* * * * *